United States Patent [19]

Metra

[11] Patent Number: 6,049,036
[45] Date of Patent: Apr. 11, 2000

[54] TERMINAL FOR CONNECTING A SUPERCONDUCTING MULTIPHASE CABLE TO A ROOM TEMPERATURE ELECTRICAL EQUIPMENT

[76] Inventor: Piero Metra, Via Virgilio, 4, Varese, Italy

[21] Appl. No.: 08/759,793

[22] Filed: Dec. 3, 1996

[30] Foreign Application Priority Data

Dec. 21, 1995 [IT] Italy .................................. MI95A2723

[51] Int. Cl.$^7$ .................................................. H01B 12/00
[52] U.S. Cl. ........................ 174/15.5; 174/15.4; 505/885
[58] Field of Search ................... 174/15.3, 15.4, 174/15.5, 19, 73.1; 505/886, 888, 885

[56] References Cited

U.S. PATENT DOCUMENTS

| 3,292,016 | 12/1966 | Kafka ................................ 174/15.5 X |
| 3,902,000 | 8/1975 | Forsyth et al. ........................ 174/15.3 |
| 4,745,313 | 5/1988 | Brunet et al. ............................. 310/52 |

FOREIGN PATENT DOCUMENTS

| 2170333 | 8/1973 | France . |
| 2170217 | 9/1973 | France . |
| 2262855 | 9/1975 | France . |

OTHER PUBLICATIONS

Bognr, "Transmission of Electrical Energy Superconducting Cables", NATO Technical Seminar, pp. 401 and 506–517, 1974.

Rechowicz, "Electric power at low temperature", Oxford University Press, pp. 103–106, 1975.

*Primary Examiner*—Huyng Sub Sough
*Attorney, Agent, or Firm*—Norris Mc Laughlin & Marcus; L. P. Brooks

[57] ABSTRACT

A terminal for connecting a superconducting multiphase cable, a superconducting three-phase cable for example, to a room temperature electrical equipment is described. The terminal includes a casing with cooling fluid, inside which the three cable superconductors are each connected with a resistive conductor the end of which is connected to the room temperature equipment phases at the outside of the casing. The terminal includes superconducting connectors between the three neutral superconductors and a single resistive conductor the end of which is externally associated with the room temperature equipment. The neutral superconducting connectors and the junction area of the connector of the single conductor are disposed inside the cold area of the casing.

20 Claims, 5 Drawing Sheets

TERMINAL FOR CONNECTING A SUPERCONDUCTING MULTIPHASE CABLE TO A ROOM TEMPERATURE ELECTRICAL EQUIPMENT

FIELD OF THE INVENTION

The present invention relates to a terminal for connecting a superconducting multiphase cable of n phases (n being greater than 1) to a room-temperature electrical equipment, a transformer for example.

DESCRIPTION OF RELATED ART

It is known that superconductors are metals, alloys thereof, oxides and in general compounds having a drop in resistivity until practically zero values at a temperature value, called critical temperature, which is characteristic of each superconductor.

Reference may be made, by way of example, as to one of these materials and the preparation of same, to the disclosure of U.S. Pat. No. 5,480,862 in the name of the assignee of this application.

These superconductors have to operate below their critical temperature, generally below −175° C. and for the purpose they are therefore cooled by appropriate cooling fluids, since above the critical temperature their state of superconductivity would cease and the cable would have resistive losses even higher than those occurring in a traditional conductor.

Generally, a superconducting cable of the coaxial type comprises, for each phase, an energized inner superconductor, at least one layer of electrical insulating material, a coaxial neutral superconductor placed at a zero potential and, in addition, a cooling fluid circulating from one end to the other of the cable along a duct internal of the phase superconductor and then along a space external thereof, all that being contained in a coating comprising a thermal insulating material adapted to keep the conductive material to the desired temperature.

In this type of cable the same current circulates, for each phase, both in the phase superconductor and the neutral superconductor.

Connection between the superconducting cable and the room temperature equipment obviously requires the use of terminals comprising areas for maintaining the superconductivity state of the cable and areas for controlling the eletrical and thermal fields of the cable in the terminal.

In a known embodiment, described by C. Bogner in a publication "Transmission of Electrical Energy by Superconducting Cables", pages 514–516, NATO Technical Seminar, 1974, a terminal for a single-phase superconducting cable comprises a vacuum container inside which a casing filled with low-temperature liquid helium is disposed.

The phase superconductor comes to the casing centre and is connected at some height in the casing to a resistive conductor passing through the casing and the vacuum container towards the outside at room temperature.

The neutral superconductor, coaxial with the phase superconductor, is in turn connected to a second resistive conductor passing through the casing and the vacuum container to reach the outside.

Interposed between the two conductors is a high-voltage insulator extending, at the upper part thereof, beyond the vacuum container to the outside and, at the lower part thereof, downwardly taking a cone-shaped configuration matching the shape of a deflector cone disposed around the phase superconductor.

The two conductors, intended for connection of the phase and neutral superconductors with the external equipment, are suitably selected so as to have an appropriate size in that, on the one hand, they should be of large cross section in order to reduce the effect of the resistive losses, but, on the other hand, they need to take a small section in order to reduce the heat conduction from the outside to the cold area within the casing where the phase and neutral superconductors are.

A solution to these two conflicting problems is described in a publication "Electric Power at Low Temperatures", Oxford University Press, M. Rechowicz, 1975, and is based on optimizing the sum of the electrical and thermal losses resulting in a consequent definition of an optimal section of the conducting metal depending on the temperature difference, the current-carrying capacity and length of the conductor, and the metal features. Practically, the phase and neutral conductors are such planned that the conductor section will make the resistive losses correspond to half those caused by thermal conduction.

The conductor section is determined by a particular expression set forth in said publication and results in making the conductors in the form of nets formed of small-diameter wires.

In the example of a single-phase terminal described by G. Bogner, these conductors in the form of nets constitute heat exchangers and transfer heat absorbed from the outside at room temperature and heat produced by current passage under a resistive effect, to a coolant that passing through the conductor nets heats up, evaporating and escaping in the form of gas from appropriate openings in the terminal.

In a terminal for a three-phase superconducting cable, connection of the cable to the room temperature equipment may be made by means of three separate structures similar to the previously described one.

In this terminal, connection between the neutral wires of the three-phase cable is carried out at the outside, at room temperature.

The Applicant, aiming at reducing thermal and electrical losses in the terminal, has sensed the possibility of solving the problem by addressing the solution to reducing thermal and electrical losses due to the arrangement of the neutral wires as done in the known art.

Perception of the problem was guided by the observation that the above described terminal, a three-phase terminal for example, comprises three current conductors to connect the three neutral superconductors to the external equipment where the neutral wires are connected with each other.

Therefore, in each neutral conductor within the terminal, even if sized so as to have said optimal section, thermal and electrical losses occur as a result of the current passage.

It is in fact known that, in a coaxial superconducting cable system, current passing through the neutral cable wires is, for each phase, identical with that passing through the phase conductors.

This situation is usually achieved by an appropriate connection of the conductors, as shown in a following figure, for the purpose of both eliminating the magnetic field external of the cable and, as a result, losses due to the induced currents, and minimizing the magnetic field present in the superconductors, maximizing performance of same.

SUMMARY OF THE INVENTION

Taking into account the plurality of thermal and electrical losses due to the three neutral conductors, the Applicant has envisaged the possibility of reducing the thermal and electrical loss balance of the whole terminal by a solution based on the connection of the three neutral superconductors in the cold area of the casing, using superconducting connection means, in turn connected to a single neutral conductor externally connected at room temperature, as previously said.

Consequently, it is an object of the present invention a thermally insulated terminal intended for connection between a multiphase cable and an electrical equipment at room temperature, said cable comprising, for each phase, at least one coaxial unit having a phase superconductor, an interposed electric insulating layer and a coaxial neutral superconductor, and in addition, thermal-control means for keeping said superconductors of each of said coaxial units to a superconductive state, said terminal comprising:

at least one casing, cooling means, a live current lead for each phase superconductor, having a related phase connector for connection to said room temperature equipment, said current lead being provided with a resistive conductor intermediate the phase superconductor and said connector of the current lead, the connecting areas between said resistive conductors and phase superconductors being disposed within the casing, said terminal being characterized in that it comprises:

a single neutral current lead provided with a single neutral resistive conductor, the upper end of which is connected to a neutral connector for connection to the room temperature equipment;

connection means made of superconducting material between said neutral superconductors and single neutral resistive conductor, the junction area between said connection means of superconducting material and single neutral resistive conductor, and at least said connection means between the neutral superconductors and said single resistive conductor being internal of the casing and at a lower temperature than the critical one corresponding to the superconductive state, due to the presence of said cooling means.

Preferably said terminal connects one three-phase superconducting cable to a room temperature equipment.

Within the present invention, by room temperature is intended a temperature higher than the critical temperature of the superconductor, in which said superconductor shows a substantially non-superconductive behaviour.

Still preferentially, said connection means comprises superconducting elements arranged in a Y connection configuration between the neutral superconductors of the cable and a connecting terminal for junction with the neutral resistive conductor.

Preferably the connection means consists of the same neutral superconductors of the cable, removed from the extremity and connected with each other in a Y-connection configuration in the connecting terminal.

In a particularly advantageous aspect of the invention, the terminal is characterized in that it comprises liquid nitrogen as the cooling fluid inside the casing.

Still preferentially, the terminal is characterized in that the casing cover is substantially at the same height as the junction area between the phase superconductors and phase conductors.

Still in accordance with the preferential solution, the terminal is characterized in hat, in a three-phase cable of a phase voltage in a range of 60 to 150 KV, the distance between the casing base and the mutual junction area between the phase and neutral superconductors and the phase and neutral resistive conductors is of a value included between 0.5 and 1 metre.

In an embodiment according to the invention, the terminal is characterized in that it comprises means for controlling the electric field for each phase, disposed within the casing.

In another aspect thereof, the present invention relates to a method of connecting a superconducting multiphase cable, maintained at a superconduction temperature, to a room temperature electrical equipment, comprising:

connecting each phase superconductor to a corresponding conducting element of said equipment, and connecting the neutral superconductors to corresponding neutral elements of said equipment, characterized in that the step of connecting the neutral superconductors to the corresponding neutral elements comprises:

connecting said neutral superconductors with each other at an area having said superconduction temperature, and connecting said neutral superconductors to said neutral elements of the equipment through a single current lead.

BRIEF DESCRIPTION OF THE DRAWINGS

The present invention will be best understood with the aid of the following description and the accompanying drawings, intended for illustrative purposes only and not in a limiting sense, in which.

DESCRIPTION OF PREFERRED EMBODIMENTS

Figure 1:
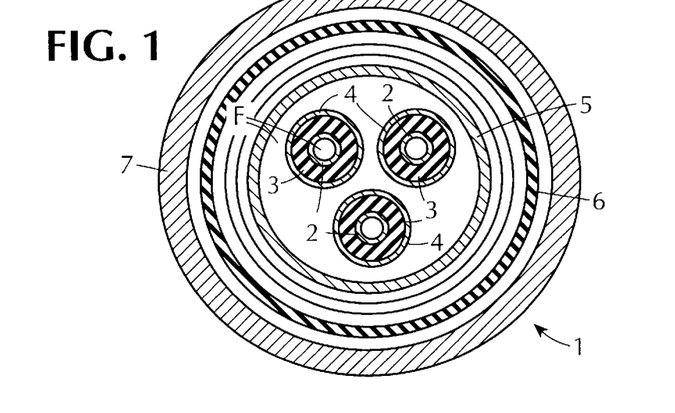
FIG. 1 shows a superconducting three-phase cable.

A superconducting three-phase cable is shown in FIG. 1 in a diagrammatic cross-sectional view and is denoted by 1; it comprises three coaxial units or "phases", each of which in turn comprises a phase superconductor 2, at least one layer of insulating material 3, a neutral superconductor 4.

The three-phase cable is cooled by means of a fluid "F", usually circulating in one direction from one end to the other of the cable, in an inner duct provided in each phase superconductor and in the opposite direction in the space around said phase superconductors or, according to another solution, in one and the same direction in the duct and the space around the phase superconductors, return taking place externally of the cable; the space around the phase superconductors is confined outwardly by a first coating 5 and a thermal insulating layer 6 and has an external coating 7 enclosing it.

The assembly formed of elements 5, 6, 7 is commonly referred to as "cryostat" and generally has the function of keeping the components at the inside thereof to the desired temperature.

In one embodiment, the superconductive material of the cable is formed of superconductor-based ribbons commonly referred to as high-temperature ribbons of a ceramic type and has a diameter of 30–40 mm for a phase current included between 2000 and 5000 A.

In more detail, in this embodiment the superconductor ribbons are wrapped around a metallic or insulating, tubular cylindrical support, according to constant or variable wrapping angles, between one ribbon and the other and at the inside of each ribbon, included between 10° and 60°.

The so-called "high temperature" superconductor-based ribbons are those capable of carrying current at a temperature in the order of 70–77° K. (−203/−196° C.).

In still more detail, for completion of the present description it is pointed out that the "high-temperature" ribbons comprise, within a casing made of silver or similar metal alloy, superconducting materials among which those referred to in the particular field by the abbreviation BSCCO and having the following formula can be conveniently employed:

$$Bi_\alpha Pb_\beta Sr_\gamma Ca_\delta Cu_\epsilon O_x$$

wherein:

α is a number included between 1.4 and 2.0; β is a number included between 0 and 0.6; γ is a number included between 1.5 and 2.5; δ is a number included between 0 and 2.5; and ε is a number included between 1.0 and 4.0; x is the stoichiometric value corresponding to the different oxides present.

Figure 2:
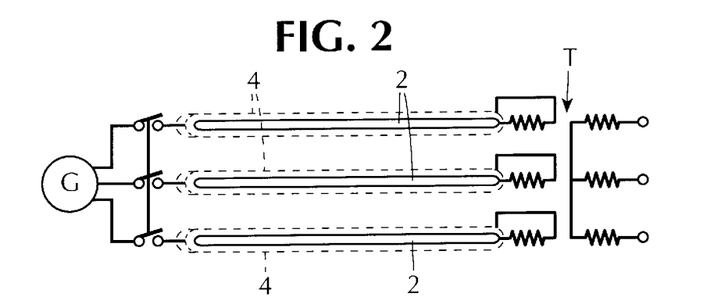
FIG. 2 illustrates an example comprising a system with three superconducting single-phase cables connected between a generator and a transformer.

Diagrammatically shown in FIG. 2 is an arrangement of three single-phase cables electrically connecting a generator G to a room temperature user equipment, a transformer T for example.

Figure 3:
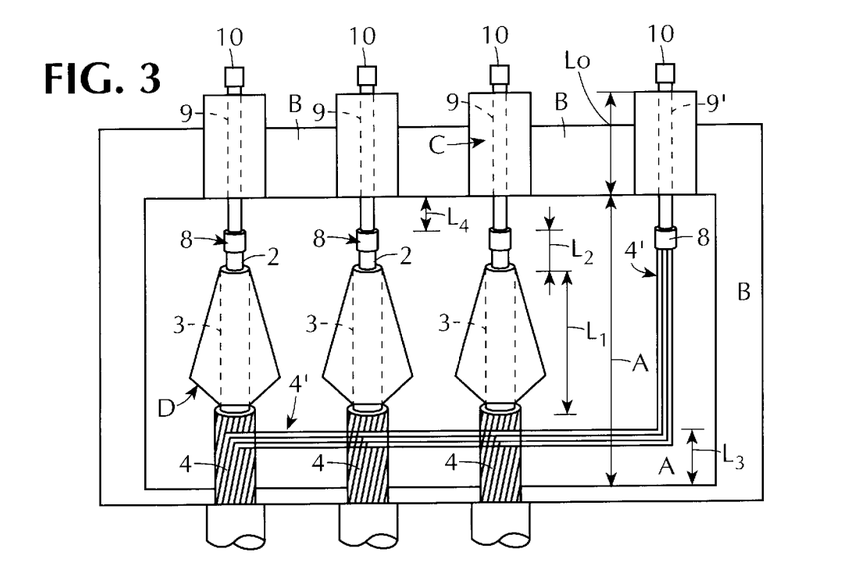
FIG. 3 shows a diagram of the important areas internal of a terminal for a system with three superconducting single-phase cables according to the invention.

Connection between the three single-phase cables and the external equipment is carried out by a terminal, not shown in FIG. 2 and diagrammatically outlined in its fundamental parts in FIG. 3, in accordance with the present invention.

Chiefly, the terminal comprises a cold area A inside which the cable portions are maintained below its critical superconductivity temperature, a thermal-insulation area B disposed around area A, a thermal control area C, of extension $L_0$, in which means for counteracting heat penetration from the outside at room temperature to the cold area of the cable is provided, an area D for control of the electric field, made either internally of the cold area over a given extension $L_1$, as shown in FIG. 3, or externally thereof.

The lower portion of FIG. 3 shows entry of the three single-phase cables into the terminal.

More particularly, each live phase superconductor 2 extends in the cold area and is joined to a resistive conductor 9 over a portion $L_2$ by a connecting terminal 8; conductor 9, in turn, passes through the thermal control area C until connection to a connector 10 of the room temperature electric equipment.

The fundamental feature of the terminal according to the invention consists in that the three neutral superconductors 4, at a distance $L_3$ from entering the cold area, are connected with each other by superconducting connection means 4' and, through a connecting terminal 8', are connected with a single lead formed of a resitive conductor 9' extending outwardly like the other phase conductors.

Preferentially, the superconducting connection means comprises a superconducting element made on the basis of the particular arrangement of the final portion of the neutral superconductors, as shown in FIG. 3 and in the following FIGS. 4, 5 and 8 described later.

In some preferential embodiments of the terminal in FIG. 3 for 60 to 150 KV voltages, the sizes of the different areas are included between the following value intervals:

thermal control area C, extension $L_0$ between 0.3 and 0.6 m, electric field control area D, extension $L_1$ between 0.5 and 1 m, junction area between phase superconductor and superconductor, extension $L_2$ between 0.2 and 0.4 m, distance $L_3$ between the lower edge of the cold area and the neutral wire connection, between 0.1 and 0.2 m, distance $L_4$ between the connecting terminal and the upper edge of the cold area, between 0.1 and 0.2 m.

Figure 4:
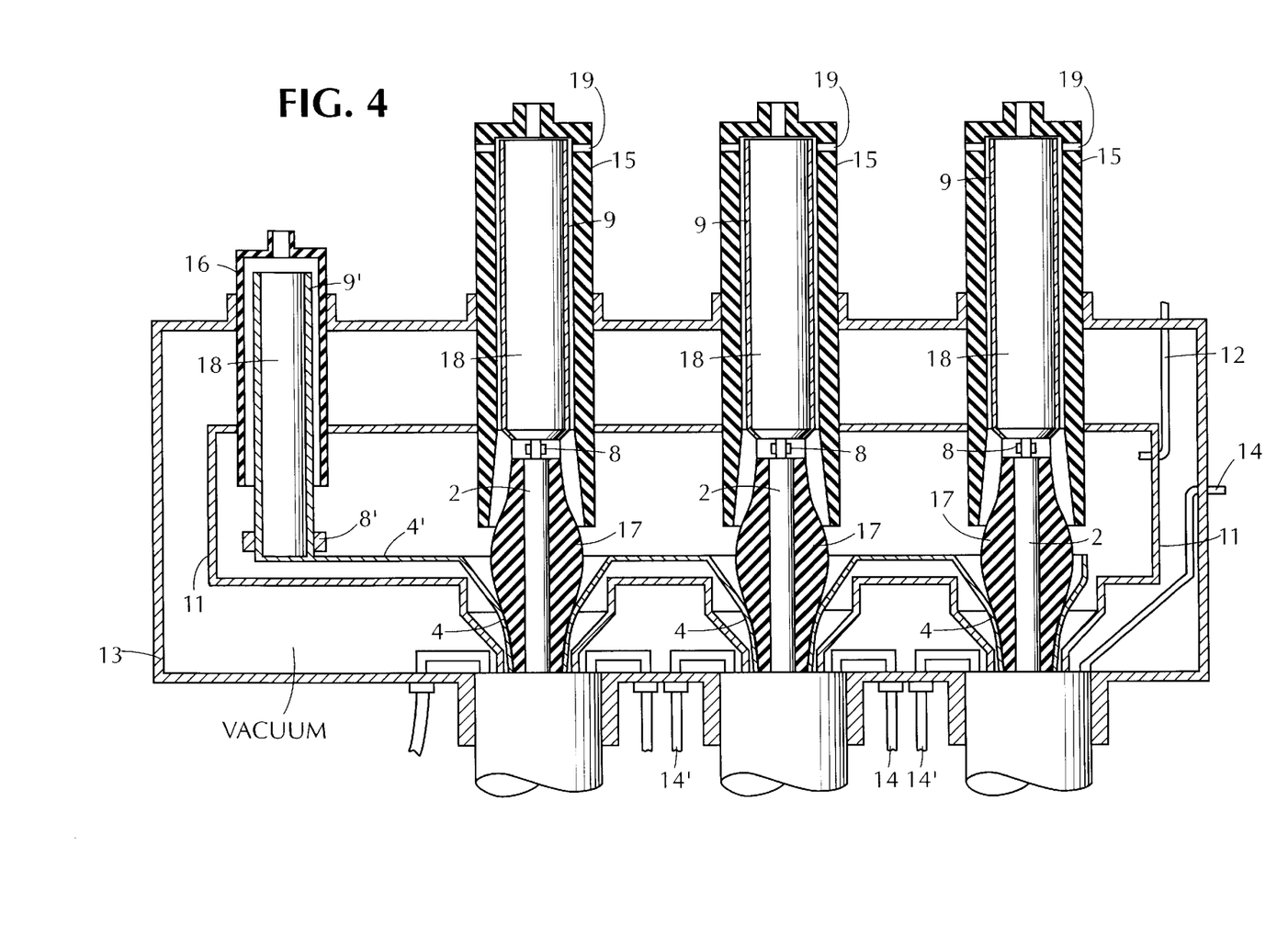
FIG. 4 is a detailed sectional view of the terminal in FIG. 3.

The terminal, in a convenient embodiment thereof, is shown in more detail in FIG. 4.

As can be seen in said figure, the cold area of the terminal is delimited by a casing 11 of metal material into which a cooling fluid, preferably liquid nitrogen at a temperature of about −200° C., is introduced through an inlet pipe 12.

Introduction of liquid nitrogen at a given temperature into the casing and the degree of thermal insulation around the casing are controlled to such an extent that the cold area of the casing is always at a temperature conveniently below −175° C., above which temperature the superconductors would stop behaving as such.

Shown in particular in FIG. 4 is the arrangement of the superconducting connection means between the neutral superconductors. As can be seen, this superconducting means is completely disposed in the lower portion of the casing and is always joined in the cold area to a single resistive conductor passing through the casing for connection to the external equipment.

The thermal insulation area around the casing consists of a container 13 confining a vacuum space around the casing.

Coming to the container and casing entry are the three single-pole cables, each of which is kept below the critical temperature by means of liquid nitrogen circulating inside it, as shown in the figure by the inlet and outlet pipes 14 and 14'.

The phase and neutral resistive conductors, 9 and 9' respectively, pass through the container and casing cover remaining at the inside of high and low-voltage insulators 15 and 16, respectively.

The inner surface of the insulators 15 has its lower portion of truncated conical form matching the shape of, and being spaced apart from a deflector cone 17 around the phase superconductor for the purpose of carrying out control of the electric field.

Conductors 9 and 9' are preferably made of metal and are in the form of a net of electrically conductive metal wires forming a jacket disposed concentrically about a cylindrical element 18 of a non-conductive material (plastic reinforced by fibre glass or the like, for example) or in any case a material of a low thermal conductivity, having a function of mechanical support so as to constitute heat exchangers with the liquid nitrogen, In the terminal during operation, there is external heat that tends to migrate by conduction through the resistive conductors to the inside, and there are currents passing through the resistive conductors 9 and 9' that dissipate energy due to the resistivity of the materials forming the conductors themselves.

The overall heat present in the leads is absorbed in countercurrent by the evaporating liquid nitrogen escaping in the form of gas from openings 19 provided in the upper portions of the insulators 15.

In order to reduce thermal and resistive losses in conductors 9 and 9', planning of an optimal section to be given to each resistive conductor has been known from the previously mentioned publication "Electric Power at Low Temperatures", Oxford University Press, 1975.

Therefore, for the sake of simplicity further details on the known criteria relating to the optimal section sizes of the phase and neutral resistive conductors 9 and 9' are omitted, as sizes can be established based on said criteria.

In accordance with a variant of the invention, the terminal can provide entry of the whole three-phase cable 1, of the type shown in FIG. 1 for example, into the cold area of the casing.

Figure 5:
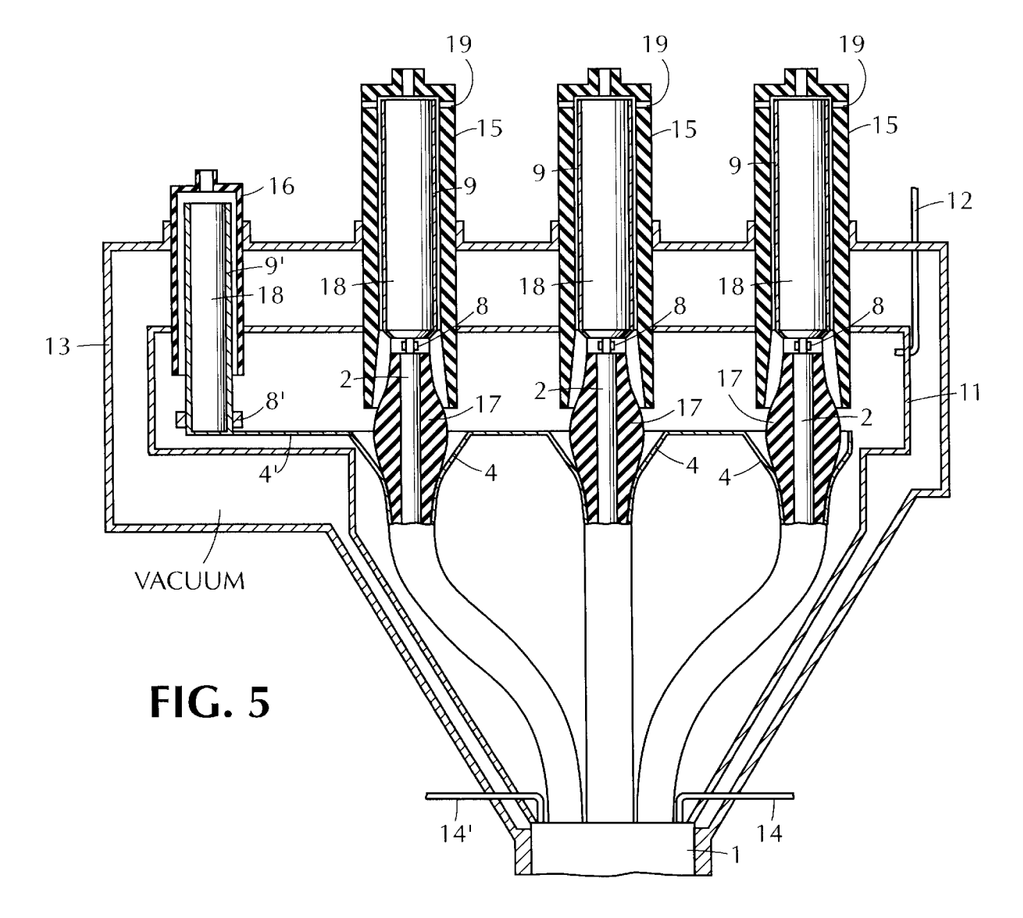
FIG. 5 is an alternative embodiment of the terminal in FIG. 4.

As clearly viewed from FIG. 5, the only variant in connection with the previous description refers to the conformation of the lower surfaces of the casing and the container suitably shaped in the form of a funnel.

In FIG. 5, since the other terminal parts are unchanged, the same reference numerals as in FIG. 4 are allocated.

In order to evaluate the results achieved with the terminal of the invention, some embodiments of a terminal made following the example of FIGS. 3 and 4 and a known terminal, compared with each other, are described. The terminals have a neutral lead for each of the phases, and the same sizes for the superconductor and conductor sections and the extensions of the different terminal areas are maintained for both compared terminals, as well as the same voltages and currents.

Figure 6:
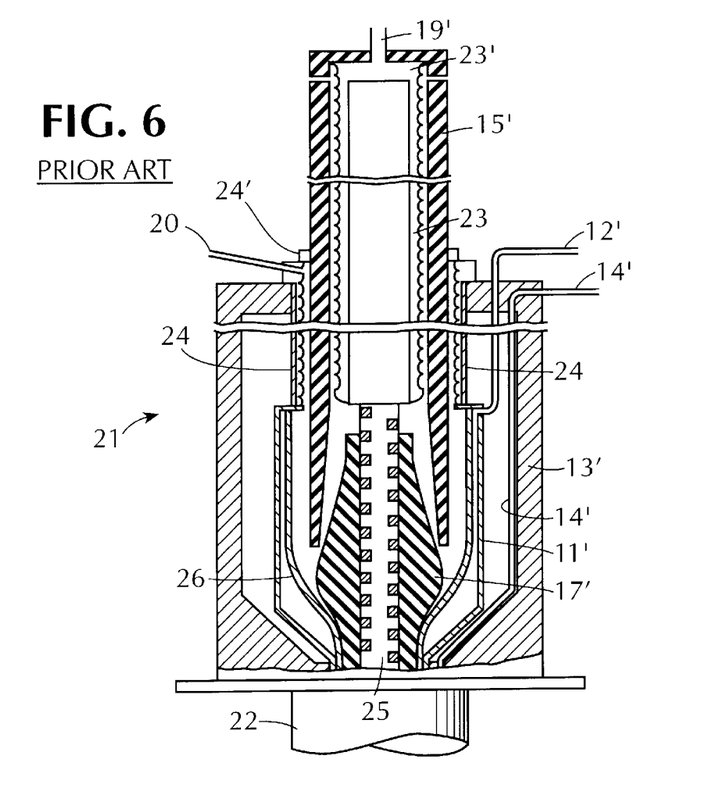
FIG. 6 shows a unipolar terminal according to the known art.

For best understanding of the comparison, in FIG. 6 terminal 21 of the known art relating to a unipolar cable 22 is recalled and diagrammatically shown.

Terminal 21 comprises a gas output pipe 20, two current leads, consisting of two coaxial conductors, 23 and 24 respectively, made in the form of heat exchangers; the two conductors 23 and 24 are disposed between the phase and neutral superconductors, 25 and 26, of cable 22 and two upper connectors 23' and 24' associated with the external equipment. The other parts of the terminal already described above are omitted for the sake of simplicity and have been allocated the same reference numerals as in FIGS. 4 and 5, with the addition of a prime.

Figure 7:
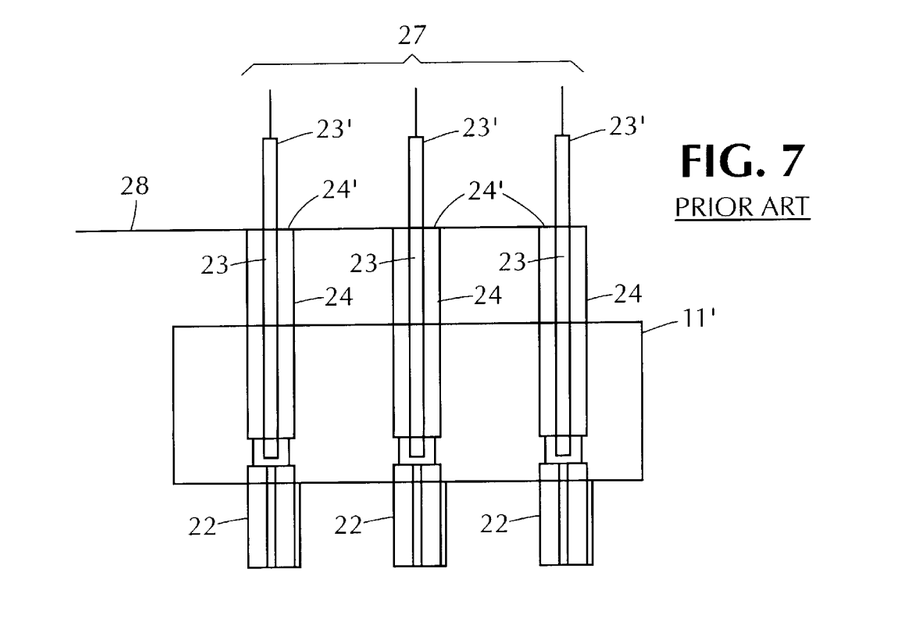
FIG. 7 is a diagram of a superconducting three-phase terminal according to the prior art.

The three-phase terminal is formed of three terminals as the one in FIG. 6, separated from each other or disposed in a single cold area, as shown for the three-phase terminal 27 of known type in the diagrammatic example in FIG. 7.

As clearly shown in FIG. 7, the terminal of the known art carries out connection 28 of the neutral wires at room temperature.

Data relating to the three-phase cable and the magnitudes and sizes of the terminal is reproduced hereinafter:

Y-connected superconducting three-phase cable with voltage between lines of 115 KV and rated current of 4100 A.

Phase and neutral superconductors made of ceramic material BSCCO of a section of 1 cm$^2$ and critical temperature of −165° C.

Resistive conductors in the phase and neutral terminals made of aluminium of a section of 200 mm$^2$.

Thermal control area C with extension $L_0$=0.30 m.

Electric-field control area D with extension $L_1$=0.70 m.

Junction area between the phase superconductor and conductor with extension $L_2$=0.20 m.

Distance between the lower edge of the cold area and the neutral wire connection $L_3$=0.30 m.

Distance between the connecting terminal and upper edge of the cold area $L_4$=0.10 m.

Current values: 4100 A and 0.00 A.

Reproduced in the following table is the result of the comparative test relating to losses expressed in W per triad with the use of liquid nitrogen in the cold area at a temperature of −196° C.

TABLE I

| Current (A) configuration | 4100 known | 4100 three phase & 1 neutral wires | 0.00 known | 0.00 three phase & 1 neutral wires |
|---|---|---|---|---|
| Resistive phase losses (W) | 3,600 | 3,600 | 0 | 0 |
| Resistive neutral losses (W) | 3,600 | 0 | 0 | 0 |
| Thermal phase losses (W) | 810 | 810 | 810 | 810 |
| Thermal neutral losses (W) | 810 | 270 | 810 | 270 |
| Sundry thermal losses (W) | 100 | 100 | 100 | 100 |
| Induced losses (W) | 0 | 80 | 0 | 0 |
| Total losses (W) | 8,920 | 4,860 | 1,720 | 1,180 |
| Total losses % | 100 | 54 | 100 | 69 |

As regards resistive neutral losses it is noted that they are zero in the terminal of the invention and of great amount in that of known type.

In fact, in the terminal of known type, neutral wires are connected with each other externally of the casing at room temperature, and through the resistive leads 24 the neutral currents of the resistive-loss-producing phases circulate.

In the terminal according to the invention, neutral currents that, as known, in a partly balanced three-phase system have a resultant which is practically zero, are compensated before entering the connecting terminal 8', and in the resistive lead 9' they circulate in the superconducting elements 4 and 4' alone, which results in the absence of resistive losses, as on the other hand shown in the table.

As regards thermal losses, it is again apparent that the characteristic of a superconducting connection of the three neutral superconductors in the cold area has enabled a single resistive conductor to be adopted in the form of a heat exchanger for connection of the neutral superconductors of the cable to the external equipment.

It should be noted that said single resistive conductor is suitably sized for a single-phase current, as in the case of each of the three phase leads of a terminal according to the known art.

Therefore, by virtue of said characteristic, thermal losses due to heat absorption from the outside to the inside are limited by the presence of a single resistive neutral conductor which will result in a consequent ⅔ reduction in losses as compared with those found in the known terminal comprising three resistive neutral conductors.

The further result with zero current again emphasizes the achieved reduction in thermal losses with the characteristics of the present invention.

From the table results, it emerges a loss by induction of 80 W in the terminal according to the invention and the absence of this loss in the known terminal.

This type of loss is due to the fact that phase currents along portion $L_2$ do not have a shielding due to the presence of coaxial neutral wires, which shielding on the contrary was present in the known terminal.

In the absence of shielding, the phase currents produce a magnetic field in the surrounding space which gives rise to the formation of induced currents in the metal structure of the casing.

However, this effect is reduced to the small values shown in the table.

In particular, this small loss is achieved by virtue of the characteristic of a greatly reduced height of the metal casing, as it appears from the above values.

In addition, consistently with the critical temperature of the superconductors, preferably the terminal uses liquid nitrogen as the cooling fluid, so that, as a result, in the metals of the structure such a temperature is produced that very low electric resistinty values are avoided, which low values can be found for example when liquid helium is used as the coolant, so that the magnetic losses, the amount of which is in inverse relation to resistivity, can be maintained to substantially negligible or in any case weak values, as above stated.

Therefore, it has been found that, by suitably governing two characteristics that by nature are separated from each other, that is the cooling liquid type and the metal casing size in height, the induced losses have such a value that they do not penalize performance of the present terminal to an important degree, as compared with the known one.

Data in the table enables an immediate understanding of the fact that the terminal according to the invention shows a reduction in the resistive losses of substantially 50% and a value of thermal losses of 70%, as compared with the known terminal.

Another advantage of the invention results from the fact that the fourth through insulator of the terminal is not onerous in terms both of construction and operation, in that its insulating voltage is negligible as compared with that of the "phases". In fact, the insulating voltage of the neutral conductor is conceptually zero; however, practically it is that corresponding to a low-voltage, instead of high-voltage, insulating level, since a certain selection of sizes in connection with possible overvoltages in the system is to be taken into account.

It is also very clear that the invention is not closely limited to the previous description but that also included therein are all solutions and alternative expedients that can be easily conceived by a persons skilled in the art although not described, based on the present solution.

Figure 8:
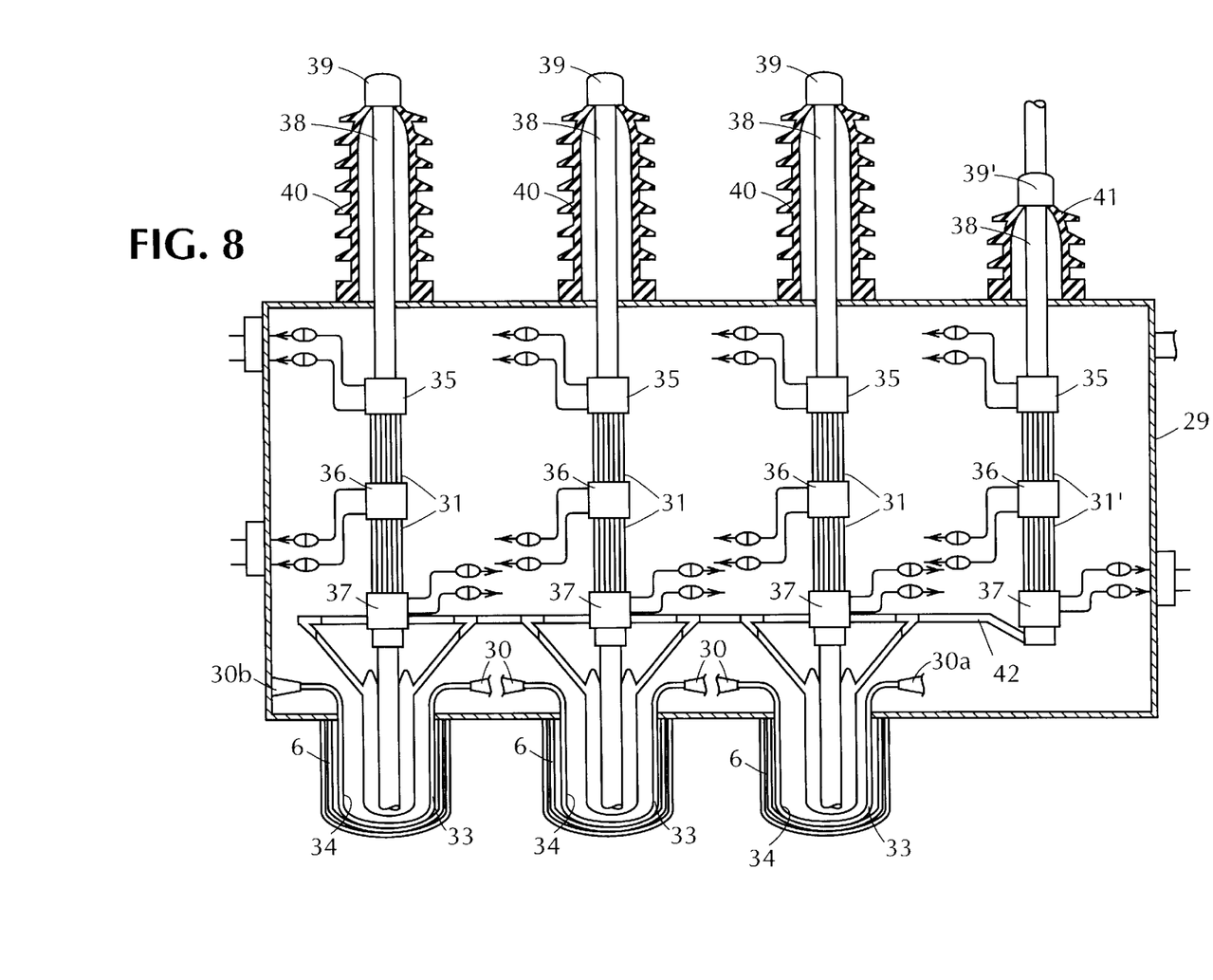
FIG. 8 shows another embodiment of the superconducting three-phase terminal according to the invention.

For example, the terminal can take the configuration shown in FIG. 8, in which in a vacuum casing 29 the cold area is determined by the circulation of a cooling fluid internally of a tubular channel 30 provided at its ends with inlet and outlet sections 30a and 30b associated with the casing walls.

According to the embodiment of FIG. 8, the three coaxial unipolar cables, protected by the screen 6 and the usual protective layers enter the casing and are passed through in the longitudinal direction by the cooling fluid, by means of inlet and outlet branches 33 and 34 of channel 30.

The thermal-field control in the resistive conductors 31 and 31' in the form of heat exchangers is carried out by means of three distinct circuits independent of each other and formed of three cylindrical double-walled bodies 35, 36, 37, travelled over by three different cooling fluids at different temperatures; these cylinders are disposed mutually offset and in coaxial relation with the resistive conductors 31 and 31'.

Electrical and mechanical connection of the terminal to the external equipment are carried out by joining the resistive conductors 31 and 31' to tubular metal portions 38 associated with connectors 39 at the ends of high-voltage insulators 40 for the three phase, and with connector 39' at the end of the low-voltage insulator 41 for the neutral wire, respectively.

The insulators are located completely externally of the casing on which they rest by their bases.

The electric field control is carried out within the insulators.

According to an embodiment already described in the above mentioned publication "Transmission of Electrical Energy by Superconducting Cables", 1974, heat entering the phase and neutral conductors from the outside is removed by making liquid helium circulate in the first circuit at a temperature of 4.4° K., liquid hydrogen circulate in the intermediate circuit at 20° K. and liquid nitrogen circulate in the upper circuit at 80° K.

The cooling temperature achieved with this configuration enables the use of this terminal also for superconductors operating at low temperature, that is the temperature of liquid helium.

The fundamental characteristic part of this terminal in accordance with the invention resides in that the neutral superconductors are joined together according to a Y-configuration in the cold portion of the casing by superconducting connection means 42, in turn connected by a connecting terminal (not shown) to the only resistive neutral conductor 31'.

By virtue of this feature, as already shown for the terminal in FIGS. 3 and 4, an important reduction in the resistive and thermal losses is achieved as compared with a terminal according to the known art, comprising three resistive phase conductors and three resistive neutral conductors with connection of the neutral wires at the outside of the casing.

It is also pointed out that the invention comprises further embodiments different from those previously described with reference to the drawings, for example terminals for multiphase cables comprising n "phases", with n greater than 1, such as a terminal for a superconducting cable comprising six phases.

The fundamental feature, irrespective of the number of "phases", is the connection of the superconducting "neutral" wires in the cold area of the terminal.

It is also apparent that the materials described in the text as being a fundamental part of the superconductors form also a fundamental part of the superconducting connection means between the neutral superconductors and single resistive neutral conductor in the lead.

In the present description, by resistive conductor is meant an electrical conducting element of non-zero resistance, in particular an element possessing at least one important portion of its own having features of non-zero electrical resistance; useful resistive conductors to the ends of the present invention are preferably low-resistivity conductors, in particular metal conductors, made of aluminium, copper and the like or equivalent materials for example, and composite elements, or also metal-superconducting material composite elements of the type used for current leads in magnets and other cryogenic apparatus.

One example of these current leads is reproduced in "Cryogenics 1993", vol. 33 No. 5, pages 555–562, and it comprises a portion of superconducting material, intended for operating in the lower area at the critical temperature of the superconducting material used, and a portion of metal material, intended for operating in the area of higher temperature.

I claim:

1. A thermally insulated terminal for connection between a multiphase cable and electrical equipment at room temperature, said cable comprising, for each phase, at least one coaxial unit having a phase superconductor, an interposed electric insulating layer and a coaxial neutral superconductor, and in addition, thermal-control means for keeping said superconductors of each of said coaxial units in a superconductive state, said terminal comprising:

at least one casing;

cooling means for cooling the interior of said casing to a temperature lower than the critical temperature at which superconductivity occurs;

a live current lead for each phase superconductor, having a related phase connector for connection to said room temperature equipment, wherein each said current lead is provided with a resistive conductor for connection intermediate a phase superconductor and said connector of the current lead to provide connecting areas between said resistive conductors and phase superconductors, said connecting areas being disposed within the casing;

a single neutral current lead provided with a single neutral resistive conductor, an end of said neutral current lead being connected to a neutral connector for connection to the room temperature equipment;

connection means made of superconducting material for connection between each neutral superconductor and said single neutral resistive conductor to provide a junction area between said connection means of superconducting material and said single neutral resistive conductor, said junction area and at least said connection means being internal of the casing;

said casing including a vacuum portion containing at least said single neutral conductor; and thermal control means formed of a plurality of mutually independent circuits having respective cooling fluids, each of said circuits consisting of a double-walled cylinder inside which said fluids circulate, said cylinders being disposed mutually offset in a coaxial relation at least about said single neutral conductor, said superconducting connection means and said junction area for connection to the neutral resistive conductor being maintained under their critical temperature by the presence, in a portion of the casing, of a channel into which cooling fluid circulates.

2. A terminal according to claim 1, characterized in that for integral connection to phase and neutral conductors respectively, there are corresponding conductive portions associated with respective insulators having connectors, said conductive portions being formed of second metallic tubular conductors extending from said one casing to the corresponding connectors of the insulators.

3. A terminal according to claim 2, characterized in that said one casing has an upper surface and said insulators have bases and wherein said insulators rest by their bases on the upper surface of the casing.

4. A thermally insulated terminal for interconnecting a superconductor multiphase cable end and electrical equipment at room temperature, said multiphase cable comprising, for each phase, at least a coaxial cable, each coaxial cable having:

a phase superconductor comprising superconductor material;

an encircling coaxial neutral superconductor comprising superconductor material; and an electric insulating layer between the phase superconductor and the neutral superconductor;

said terminal comprising:

at least one casing maintained at a temperature for keeping each of said phase and neutral superconductors at a superconductive temperature;

a phase current lead for each phase superconductor having a first end and a second end and including a phase resistive conductor, wherein said first end is disposed within the casing and is for connection to the respective phase superconductor and wherein said second end is at room temperature and is for electrical connection to said electrical equipment;

a single neutral current lead having a first end and a second end and including a single neutral resistive conductor, wherein said first end of said neutral current lead is disposed within the casing;

a connecting superconductive conductor disposed in said casing and for electrical connection of all of the neutral superconductors to said first end of said neutral current lead; and wherein said second end of said neutral current lead is at room temperature and is for connection to said electrical equipment.

5. A terminal according to claim 4, characterized in that said casing comprises liquid nitrogen as a cooling fluid.

6. A terminal according to claim 5, characterized in that the phase and neutral resistive conductors comprise a heat exchanger for heat exchange with said cooling fluid.

7. A terminal according to claim 5, characterized in that a shield for controlling the electric field for each phase is provided for receiving each phase conductor and is disposed within the casing.

8. A terminal according to claim 7, characterized in that each shield is formed for extending around the respective phase conductor in the form of an electric field deflector body having conical exterior surfaces, made of an electrically conductive material, surrounded by an insulating body.

9. A terminal according to claim 4, characterized in that the phase current and neutral current leads partly project from the casing.

10. A terminal according to claim 9, wherein said multiphase cable to be connected to electrical equipment by the terminal is a three-phase cable of a phase voltage included in the range of 60 to 150 KV, wherein the casing has a base and wherein the distance between the casing base and the connections for the phase and neutral conductors to the phase and neutral resistive superconductors is of a value included between 0.5 and 1 meter.

11. A terminal according to claim 4, characterized in that said casing has an upper surface substantially at the same level as the connections between the phase conductors and phase resistive conductors.

12. A terminal according to claim 4, characterized in that the terminal further comprises a plurality of mutually independent circuits, respectively, having cooling fluids, each of said circuits comprising a double-walled cylinder inside which said fluids circulate, said cylinders being disposed mutually offset in a coaxial relation at least about said single neutral conductor which is contained in at least a vacuum portion of the casing, the connection of said connecting superconducting conductor to the neutral resistive conductor being maintained at a temperature under the critical superconducting temperature of the connecting superconducting conductor and the neutral resistive conductor by the presence, in a portion of the casing, of a channel into which circulating cooling fluid is directed, via inlet and outlet branches, for cooling the neutral phase superconductors of the cable.

13. A terminal according to claim 12, characterized in that the terminal further comprises conductive portions associated with respective insulators having connectors which are for integral connection with the corresponding phase and neutral superconductors of the cable, respectively, said conductive portions being formed of metallic tubular conductors extending from the casing to the corresponding connectors of the insulators.

14. A terminal according to claim 13, characterized in that said casing has an upper surface and said insulators have bases and wherein said insulators rest at their bases on the upper surface of the casing.

15. A terminal according to claim 4, characterized in that the casing has an entry for each coaxial cable and has respective independent thermal insulation for each coaxial cable at said entry.

16. A terminal according to claim 4, characterized in that the casing has an entry for the coaxial cables and a common thermal insulating body for the coaxial cables.

17. A terminal according to claim 4, characterized in that the terminal is for interconnecting coaxial cables, each of which comprises a cryostat in which liquid nitrogen is circulated, with electrical equipment at room temperature.

18. A terminal according to claim 4, characterized in that said neutral current lead has cross-sectional dimensions less than the cross-sectional dimensions of said phase current leads.

19. A method of connecting a superconducting multiphase cable having a plurality of phase superconductors and a neutral superconductor for each phase conductor maintained at a superconducting temperature, to a room temperature electrical equipment, comprising:

connecting each phase superconductor to a corresponding phase element of said equipment, and connecting the neutral superconductors to corresponding neutral elements of said equipment, characterized in that the step of connecting the neutral superconductors to the corresponding neutral elements comprises:

connecting said neutral superconductors with each other at an area having said superconducting temperature, and connecting said neutral superconductors to said neutral elements of the equipment through a single current lead.

20. A terminal according to claim 4, characterized in that said casing is adapted to receive end portions of each of the neutral superconductors within the casing and extending to the neutral current lead for forming said connecting superconductive conductor.

\* \* \* \* \*